Figure 16:
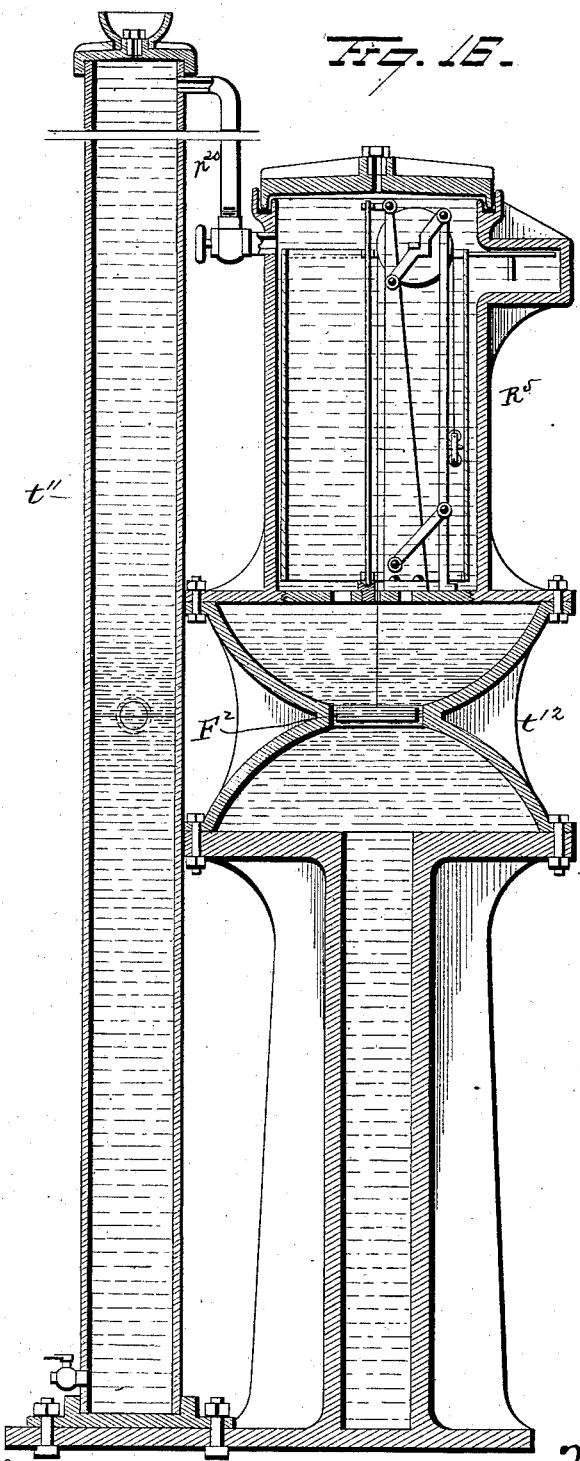

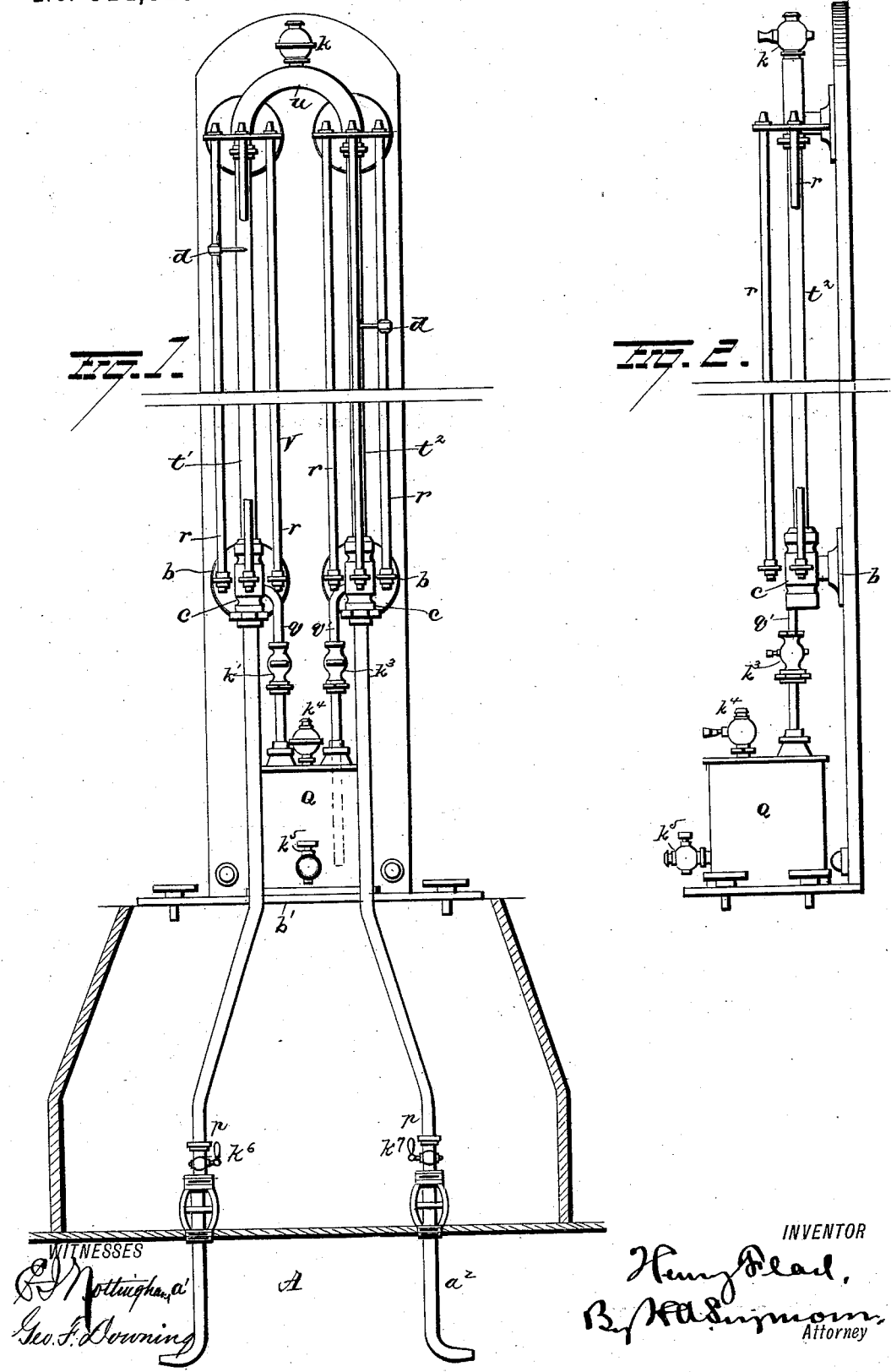

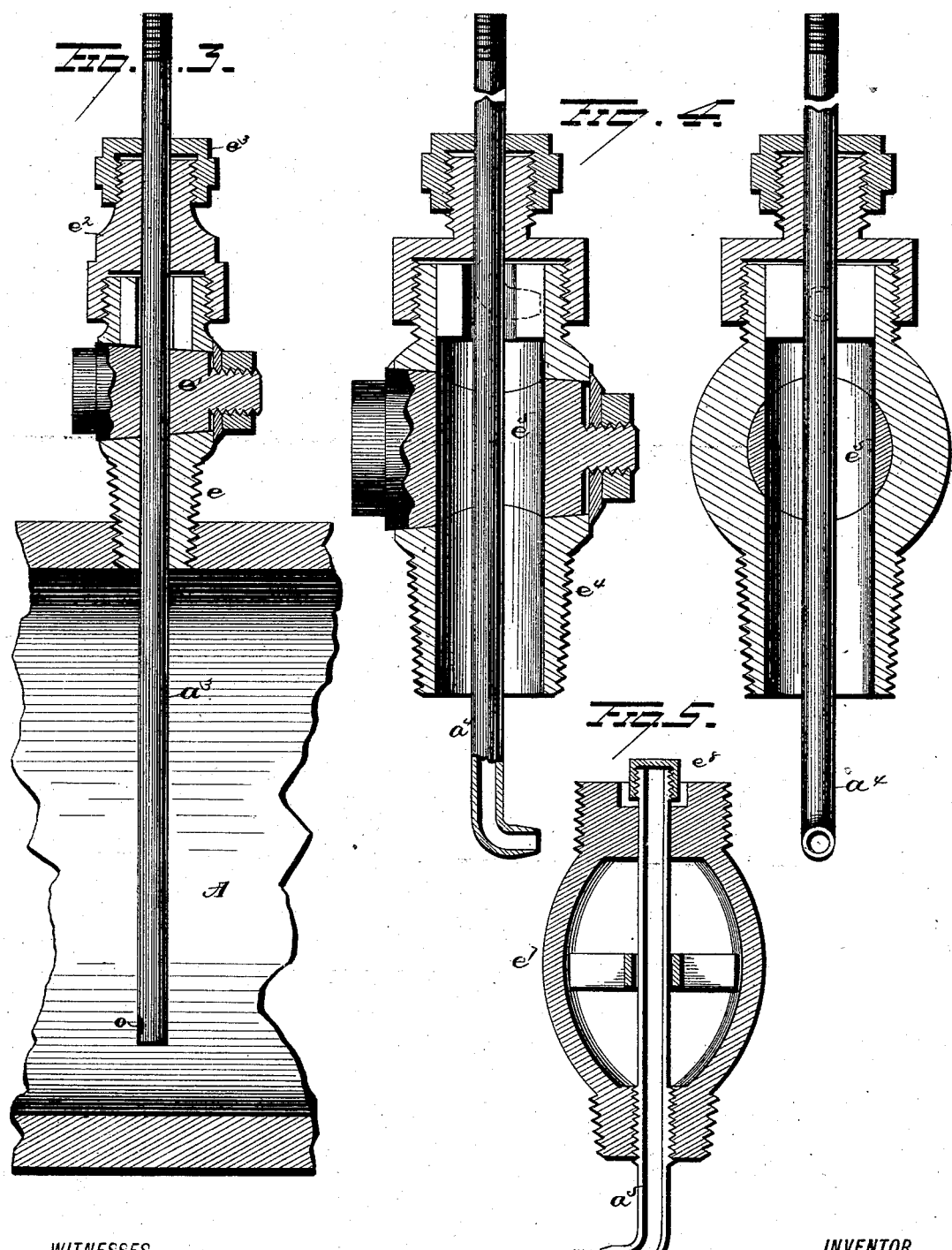

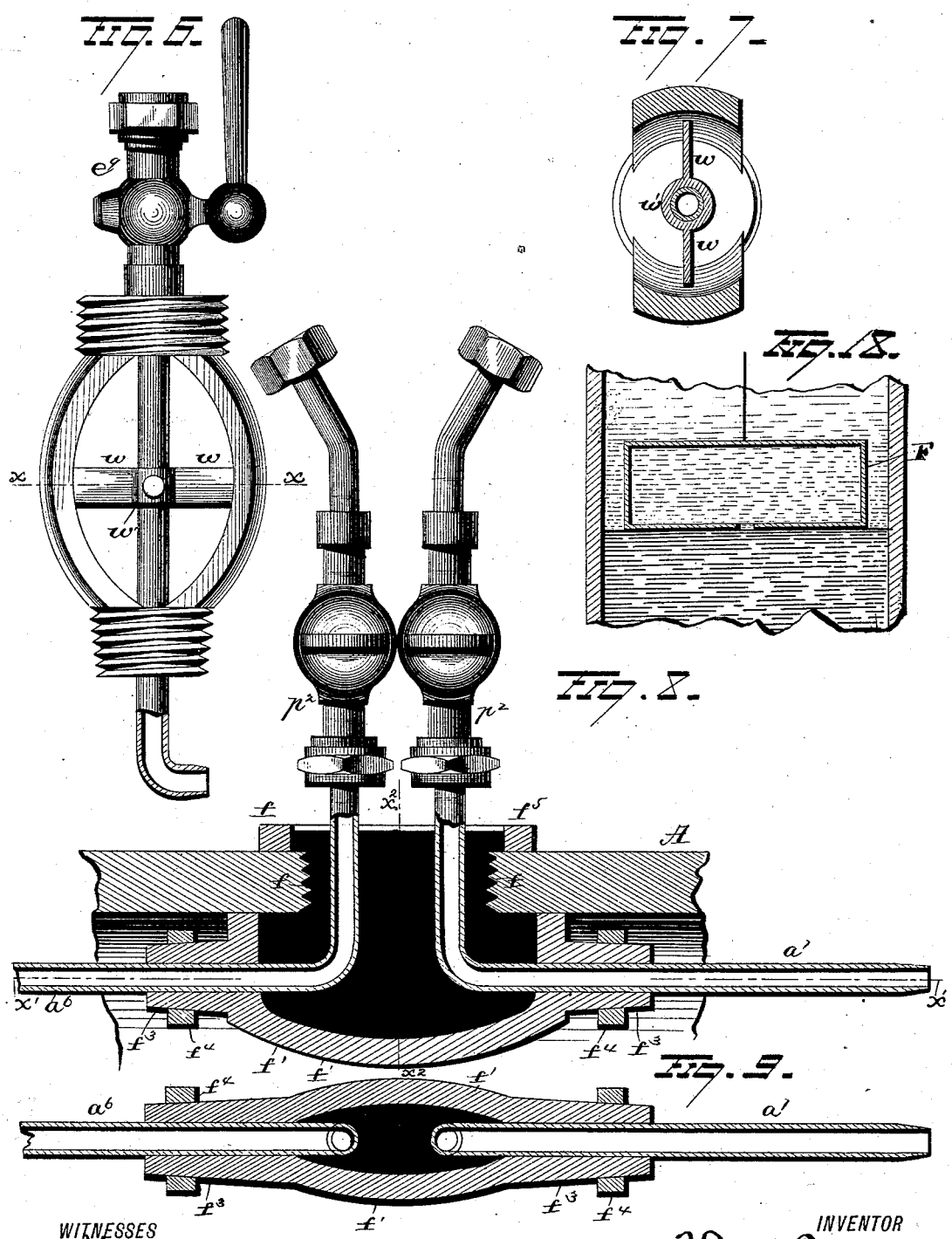

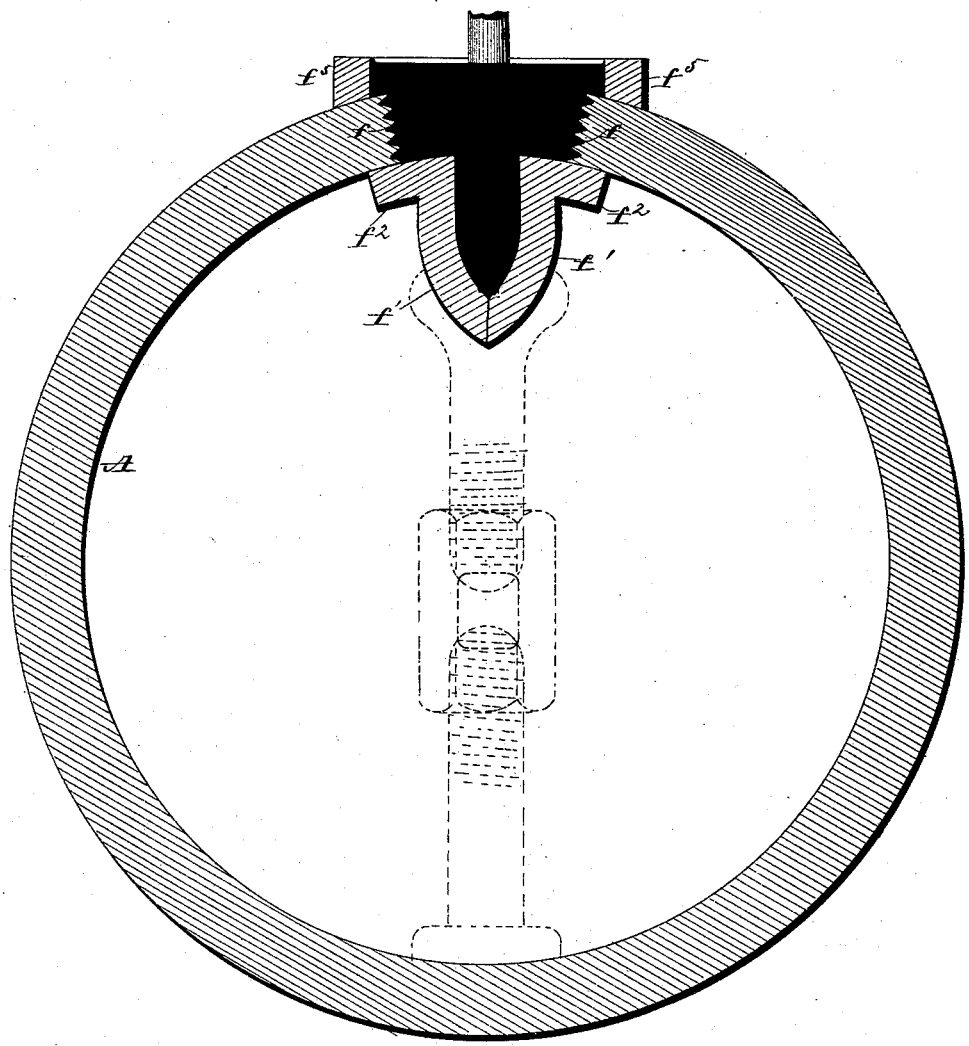

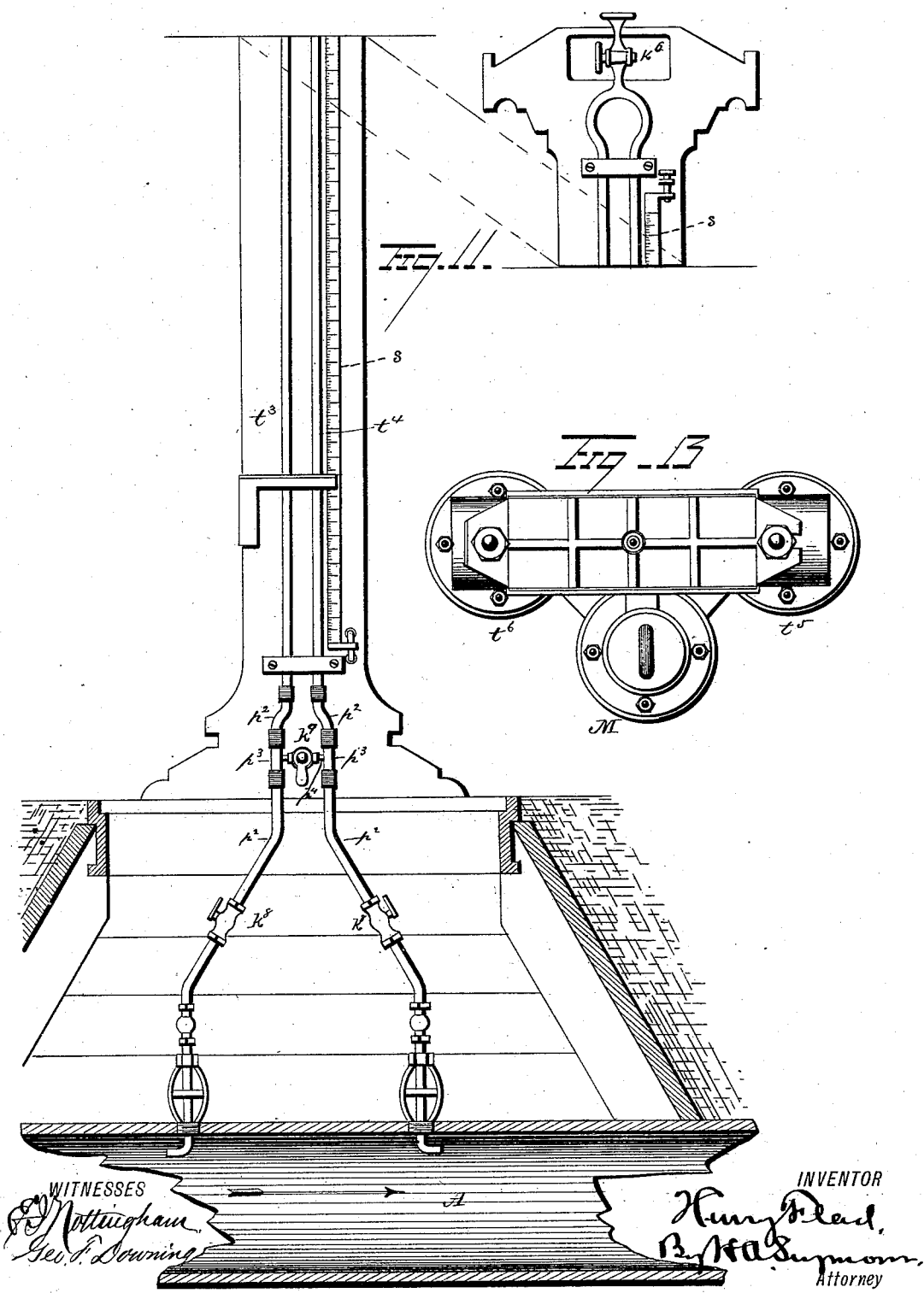

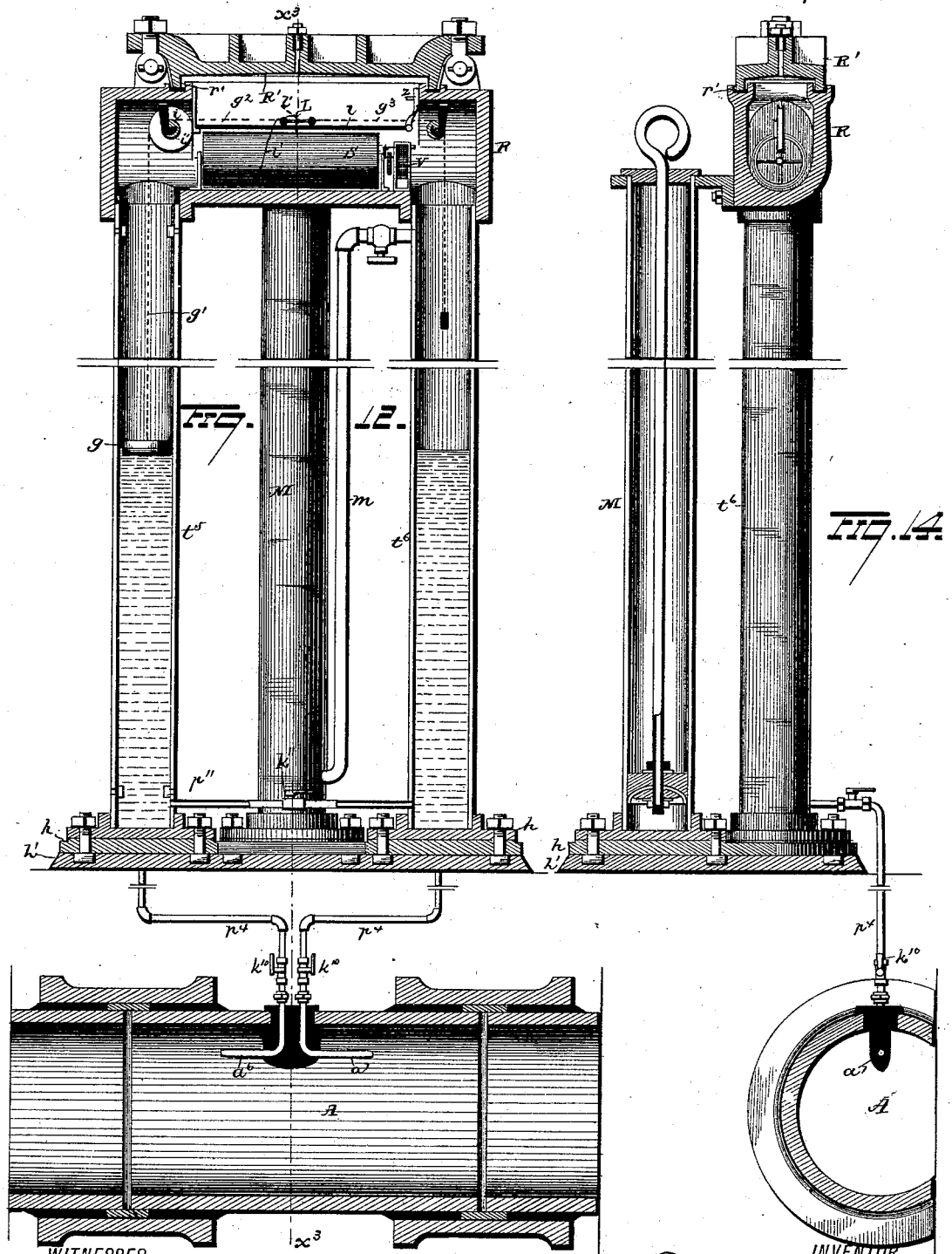

(No Model.) 9 Sheets—Sheet 7.
H. FLAD.
VELOCIMETER FOR WATER CURRENTS.
No. 314,323. Patented Mar. 24, 1885.
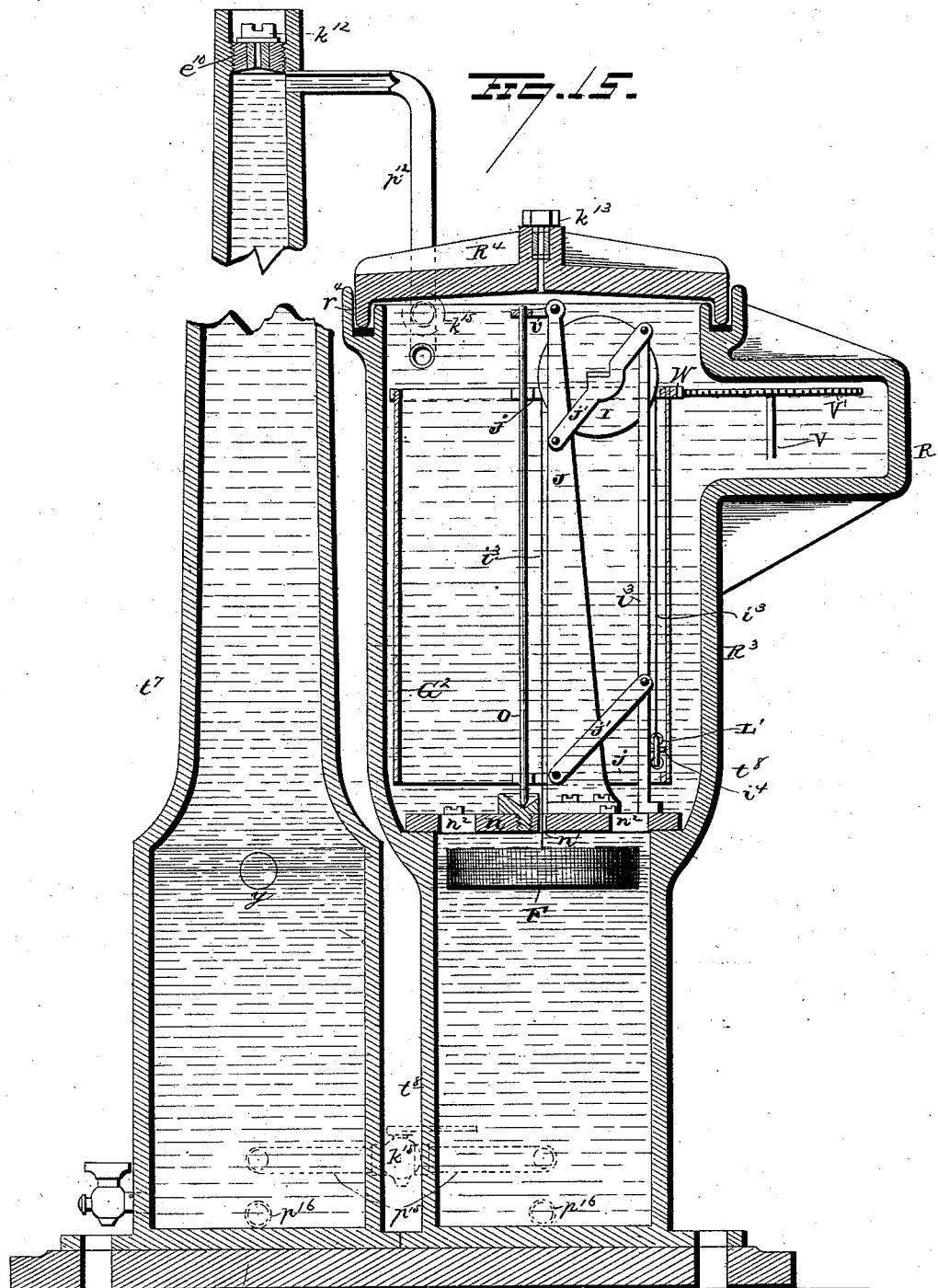

(No Model.) 9 Sheets—Sheet 8.

H. FLAD.
VELOCIMETER FOR WATER CURRENTS.

No. 314,323. Patented Mar. 24, 1885.

WITNESSES
S. J. Nottingham
Geo. F. Downing

INVENTOR
Henry Flad
By H. A. Seymour, Attorney

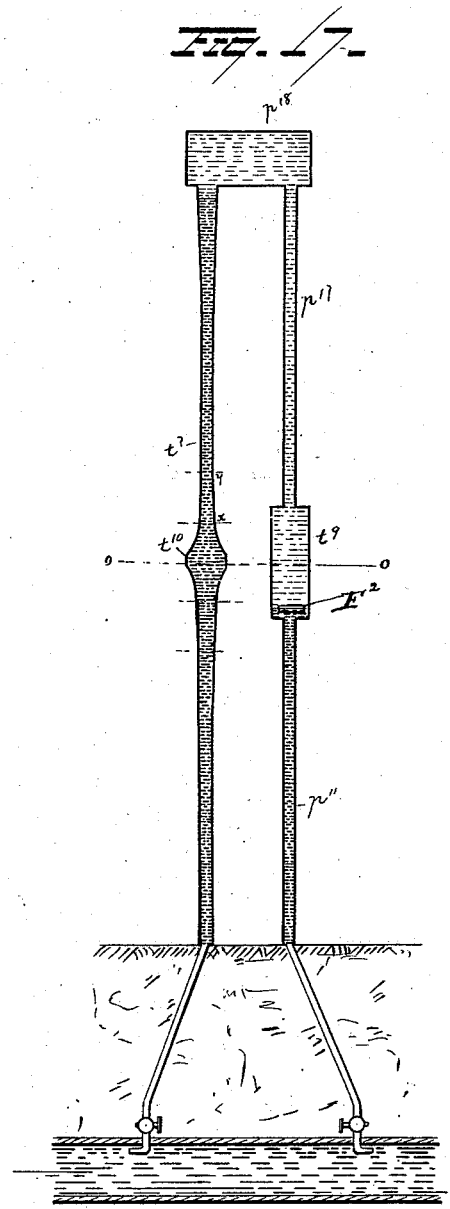

UNITED STATES PATENT OFFICE.

HENRY FLAD, OF ST. LOUIS, MISSOURI.

VELOCIMETER FOR WATER-CURRENTS.

SPECIFICATION forming part of Letters Patent No. 314,323, dated March 24, 1885.

Application filed October 31, 1883. (No model.)

*To all whom it may concern:*

Be it known that I, HENRY FLAD, of St. Louis, in the county of St. Louis and State of Missouri, have invented certain new and useful Improvements in Velocimeters; and I do hereby declare the following to be a full, clear, and exact description of the invention, such as will enable others skilled in the art to which it appertains to make and use the same.

This invention relates to an apparatus for indicating the velocity of water-currents, and is especially designed for indicating the rate of flow of water under pressure in pipes.

The main object of the invention is to combine the two forces of impact and draft of a current for giving an indication of its velocity; and it has as subsidiary objects the securing of uniform indications for successive increments and decrements of speed within certain limits, the permanent automatic recording of velocity during given intervals, and the enabling of observations of velocity to be taken at various points along a main or water-pipe.

The invention will be fully understood from the following particular description, in connection with the accompanying drawings, in which—

Figure 1 is a front elevation of a simple form of velocimeter constructed according to my invention as applied to use, the water-main being shown in section. Fig. 2 is a side elevation of the instrument detached from the water-main. Fig. 3 is a vertical diametric sectional view of a portion of a water-main and devices for connecting the velocimeter therewith, such connecting devices being adapted for application while water is flowing in the main. Fig. 4 is a diametric section of a modified form of connecting devices. Fig. 5 is a similar view of another modification of the connecting devices. Fig. 6 is a side elevation of the same with a cock attached. Fig. 7 is a section on line $x\ x$ of Fig. 6. Fig. 8 is a vertical diametric section of a portion of a water-main, a partial section in the same plane of a form of connecting devices designed for permanent attachment to a section of the main before it is arranged in the pipe-line, and a section of devices used in applying the connecting devices. Fig. 9 is a section on line $x'\ x'$ of Fig. 8. Fig. 10 is a cross-section of the main and connecting devices in a plane indicated by the line $x^2\ x^2$ of Fig. 8, the view showing also, partly in section and partly in elevation, the instruments used in applying the connecting devices. Fig. 11 is a front elevation of a modified form of the velocimeter applied to use. Fig. 12 is a view of the automatic recording-velocimeter, partly in elevation and partly in vertical section. Fig. 13 is a top view of the instrument. Fig. 14 is a vertical section on line $x^3\ x^3$ of Fig. 12. Fig. 15 is a vertical diametric section of a modified form of automatic recording-velocimeter. Fig. 16 is a similar view of another modification of automatic recording-velocimeter. Fig. 17 is a diagram illustrating the instruments shown in Figs. 15 and 16. Fig. 18 is a diametric section of a portion of one of the velocimeter-tubes and the float arranged therein.

Before proceeding to describe the construction of the several instruments shown in the drawings, I will briefly state the nature of previous analogous instruments for measuring the velocity of running water.

When a tube open at both ends and having its lower end bent at a right angle is immersed in running water, so that the lower bent portion is parallel to the line of current and its end turned toward the approaching stream, the top of the column of water which enters the tube will, by the impact of the current, be raised above the surface of the water outside the tube. Now let $h$ represent the height of the top of the water-column in the tube above the general surface of the stream, $v$ the velocity of the water in feet per second, and $2g$ represent the quantity 64.4, and we have the following formula: $h = \dfrac{v^2}{2g}$, in which $h$ represents the elevation of the column of water above the surface in feet. An instrument of this kind, known as "Pitot's tube," has long been in use for measuring the velocity of water in open channels; but it is open to objections. In the first place, the height of the column in the tube above the stream-surface is very slight when the velocity is low—for a velocity of one foot per second, for instance, it is $h = \dfrac{1}{64.4} = 0.0155$ feet. In the second place, the backing up of the water when it strikes the vertical stem of the tube makes it difficult to observe with accuracy the relative levels of the water inside and outside the tube. It has, besides, been found that the height of the column inside the tube above the surface of water on the outside does not perfectly correspond with the theoretical height, and that therefore a coefficient for correction has to be introduced, such coefficient requiring to be ascertained experimentally for each instrument.

The defects of Pitot's tube were partly remedied by D'Arcy, who used two tubes instead of one, the tubes being connected at their upper ends, and the lower end of one being bent toward the current, while the lower end of the other opened in a direction perpendicular to the current. Provision was made for exhausting or compressing the air in the upper part of the tubes and for cutting off the connection of the water contained in the tubes with the water outside by means of simultaneously-operating cocks. The D'Arcy instrument, however, still required a coefficient to be found by experiment to enable velocities to be correctly calculated, and could not be used for measuring the velocity of water flowing in pipes under pressure.

In my instrument, which will be presently particularly described, I use two tubes connected at top and having their lower open ends opening in exactly opposite directions, the openings to be arranged so that one will receive the impact of the current and the other will have a suction through it caused by the draft of the water passing. Before insertion or commencement of the experiment the tubes are filled to about half their height with water, and the connected space above the water in the two tubes is filled with compressed air, or some liquid which is lighter than water and does not mix with it—such as gasoline, oil, or benzole. By using these liquids in place of compressed air the fluctuations in the height of the columns arising from the constant changes of pressure in a water-main are entirely avoided, and the difference in the height of the columns is considerably increased as compared with the difference in the heights shown when compressed air is used. The nearer the specific gravity of the superincumbent liquid approaches that of water, the larger will be the difference in the height of the columns for any given velocity. On the other hand, the employment of these liquids requires the vertical measuring-tubes of the velocimeter to be longer.

In the recording form of my velocimeter I use a float in one or both of the tubes, the rise and fall of which floats I cause to operate portions of a recording mechanism, while other portions are moved by clock-work. By numerous experiments I have found that the difference in the height of the two columns—one acted on by impact and the other by suction—in an instrument in which compressed air is used between the columns of water in the respective tubes is equal to $2h$, or $d = \dfrac{v^2}{g}$ when $d$ represents the difference in the height of the two columns in feet, $v$ the velocity in feet, and $g =$ acceleration of gravity $= 32.2$ feet. When the difference in the height of the two columns has been measured, the velocity of the water is found from the formula $v = \sqrt{gd} = 5.6745\sqrt{d}$, when $v$ and $d$ are given in feet, and $v = 19.657\sqrt{d}$, if $v$ and $d$ are given in inches. From this is obtained the formula $d = 0.002588v^2$. The clear length of the indicating or measuring tubes of a velocimeter in which the upper portions of such tubes are filled with compressed air is expressed by the formula $l = 0.002588v^2$, supposing $l$ to represent the length of the cylinders in inches; $v$, the maximum velocity in inches which is expected to prevail in the water-main, and which is to be ascertained. To be able to determine with an instrument of this kind a velocity of six feet per second, the vertical tubes or cylinders must have a length of 13.416 inches, and to measure a velocity of ten feet requires the tubes to have a length of 37.267 inches. The difference, $d$, in the height of the columns of water contained in the vertical tubes for any given velocity, $(v)$ when the space above the water is filled with a liquid of a given specific gravity, $w$, is $$d = \frac{12v^2}{g}\left[\frac{1}{1-w}\right] = 0.372\frac{v^2}{1-w},$$

in which formula $d$ equals difference in height of columns in inches, ($d$ has the same value when air is used,) $v$ equals velocity in feet, and $g = 32.2$. From this we obtain the following formulæ for different mediums:

For gasoline, (specific gravity 0.7244,)
$$d = \frac{0.372}{0.2755}v^2 = 1.35v^2, \text{ or } v = \sqrt{\frac{d}{1.35}}.$$

For olive-oil, (specific gravity 0.9,)
$$d = \frac{0.372}{0.1}v^2 = 3.72v^2, \text{ or } v = \sqrt{\frac{d}{3.72}}.$$

For benzole, (specific gravity 0.953,)
$$d = \frac{0.372}{0.047}v^2 = 7.91v^2, \text{ or } v = \sqrt{\frac{d}{7.91}}.$$

For air, $d = 0.372v^2$, or $v = \sqrt{\dfrac{d}{0.372}}$, in all of which formulæ $v$ denotes velocity in feet, and $d$ the difference in height of columns in inches. From this it appears that the difference in the height of the columns of water will be 3.63 times as great when gasoline is used above the water as when air is used; ten times as great for olive-oil as for air; 21.2 times as great for benzole as for air, and the height of the tubes must, of course, correspond to the medium used.

In the recording form of velocimeter, as has been stated, the movement of a float is caused to produce the record; but as the actual distances traveled by the float are too great to be recorded with convenience on a cylinder of ordinary length, they are reduced to indicative distances by means which will be readily understood when I come to describe that form of instrument.

If the tubes of the instrument have uniform and equal diameter, equal increments in velocity do not produce equal difference of height in the water-columns or equal travel of a float, and I have therefore used certain expedients for causing uniform indicators to be given by equal increments or decrements of velocity, as will at the proper time be fully explained.

I will now with reference to the drawings describe the construction and operation of my invention in the several forms illustrated.

In Fig. 1, the letter A indicates a water-main, into which, perpendicular to its axis, are inserted two tubes, $a'$ and $a^2$, said tubes being supported by devices which will be presently described. The lower ends of these tubes are bent in opposite directions and both parallel with the axis of the main, while their upper ends outside the main are connected by pipes $p\ p$ with the lower ends of the tubes $t'$ and $t^2$ of the instrument V, which is the velocimeter proper. These tubes $t'$ and $t^2$ are of glass, and are of a length suitable for the maximum velocity to be measured, such length being ascertained in the manner heretofore explained. At their lower ends these glass tubes are inserted in metallic couplings $c\ c$, which are supported by brackets secured to a back board, $b$, the lower ends of said couplings being connected directly to the pipes $p\ p$. At their upper ends the glass tubes are connected together by a curved metal tube, $u$, having its ends provided with suitable coupling devices and supported by brackets secured to the back board. Said curved tube has at its highest point a cock, $k$, by which air may be allowed to escape when necessary. The brackets which support the metallic couplings $c$ and bent tube $u$ are connected by suitable tension-rods, $r$, as in steam and water gages in which vertical glass tubes are used, and upon two of these rods are arranged sliding pointers $d\ d$, the tips of which stand adjacent to the glass tubes $t'$ and $t^2$, respectively. From intermediate points of the coupling $c\ c$ short metallic tubes $q\ q'$ lead downward to an air-vessel, Q. One of these tubes, $q$, connects with the top of the air-vessel, and the other, $q'$, extends into the air-vessel and nearly to its bottom, as shown in dotted lines. The two tubes $q$ and $q'$ are provided with cut-off cocks $k^2$ and $k^3$, and the air-vessel Q has a cock, $k^4$, at its top, and another, $k^5$, near its bottom. The back board and air-vessel rest on a base-board, $b'$, provided with thumb-screws, by which it may be secured to any suitable foundation, such foundation being usually timbers across the top of a pit which affords access to the main, as shown in the drawings.

The mode of using the instrument as now described is as follows: The instrument V having been located over a point where the tubes $a'$ and $a^2$ are inserted in the main, and the glass tubes connected to said tubes by the pipes $p\ p$, the cocks $k\ k^2\ k^3\ k^4\ k^5$ being closed, the cocks $k^6\ k^7$ at the upper ends of tubes $a'$ and $a^2$ are first opened and the water admitted to the glass tubes $t'$ and $t^2$. The air in pipes $p\ p$ and the glass tubes will be compressed, and the water will rise in the glass tubes until the pressure of air therein is equal to the pressure of the water in the main. To give the greatest range to the observations, the tops of the water-columns should at the beginning of the experiment stand near the middles of the glass tubes. If when the water is admitted the columns stand at the same level and above the middles of the glass tubes, the water in the main being at rest, additional compressed air will have to be introduced into the said tubes, and so if while the water in the main is in motion the column of water in one tube stands at a greater distance above the middle of the tube than the other column stands below that point. When the top of the columns of water or their average levels are found below the middles of the tubes, air must be withdrawn from said tubes. The introduction of compressed air into the tubes may be effected by a small force-pump attached temporarily or permanently to the cock $k$ in the curved tube $u$, which connects the tops of the two tubes; but generally it is preferable to use the air-vessel Q. For this purpose the cock $k^3$ is opened, which admits water from glass tube $t^2$ and the main to the bottom of the air-vessel, said vessel containing nothing but air at the beginning of the experiment. After the air in the upper part of the air-vessel has been sufficiently compressed to produce equilibrium, the cock $k^2$ is opened, which allows the compressed air to enter glass tube $t'$. As soon as a sufficient quantity of air has entered the tubes to cause the tops of the water-columns to assume the desired positions the cocks $k^2$ and $k^3$ are to be closed. To prepare the air-vessel for another operation of the same kind, the cocks $k^4$ and $k^5$ are opened until all the water has run out of the air-vessel and are then closed. When the water-columns in the glass tubes are too low, they may be brought to the desired positions by allowing air to escape from the cock $k$. The initial height of the water-columns having been adjusted, the differences between their heights when measured give the velocity of the water in the main by the equation, as heretofore stated, $v = 19.657 \sqrt{d}$, in which $v$ and $d$ are expressed in inches.

In this instrument using compressed air over the water, the constantly-varying pressure of the water in the main causes the columns to alternately compress the air and allow it to expand, so that a dancing motion of the columns is produced, rendering it somewhat difficult to read the differences of height accurately, although they may preserve nearly the same difference. To facilitate the measurement, the sliding pointers $d\ d$ are provided, and by adjusting these pointers to the maximum heights of the columns of water, respectively, the difference can be ascertained at leisure by measuring the vertical distance between the two pointers.

In this instrument it is not necessary that the two glass tubes shall have exactly the same inside diameter, or that each shall have a uniform inside diameter throughout its length, nor will a slight leakage of air at the cock $k$ interfere with the approximate correctness of the observations.

Before passing to descriptions of modifications of the indicating portions of the instrument, I will now describe the connecting-tubes in detail, and several means for connecting the same tubes to mains.

In Fig. 3, $e$ indicates a metal ferrule or cock-tube, which is tapped into the main and provided with a plug, $e'$, having a diametric port of proper size for the snug passage of the tube $a^3$, which also passes through a cap-piece, $e^2$, screwed upon the top of the tube and through a stuffing-box, $e^3$, screwed upon the cap-piece, a suitable packing-ring being placed in said stuffing-box. The tube $a^3$ is not bent at the lower end, but has an opening at one side, as shown at $o$, and when two such tubes are inserted in a main the openings are to be turned in opposite directions in a line with the current. Such tubes are not to be used when accurate observations are required, but simply to ascertain if there is any flow at all and of what approximate velocity. They may also be used with two instruments located at some distance apart, for the purpose of ascertaining if any water is leaving the main between two stations, and what approximate quantity is being withdrawn.

In Fig. 4, the tube $a^4$ is bent at a right angle at its lower end, and has its wall beveled to one annular knife-edge, so as to avoid causing a backing up or eddying of the water at the mouth of the tube. The cock tube or ferrule $e^4$ has a greater proportionate diameter than the ferrule $e$, so that the bent end of the tube can pass through it, and the plug $e^5$ is slotted, to also permit the passage of the bent end of the tube. When the tubes are drawn above the plugs in the two forms of ferrule shown in Figs. 3 and 4, said plugs may be turned to prevent the flow of water from the main; but while in Fig. 3 the straight tube may be withdrawn separately, in Fig. 4 the cap and stuffing-box must be removed with the tube $a^4$, as its bent end cannot pass through them. Ferrules such as shown in these two figures are intended to be inserted in pairs at various points along a water-main, where it may be considered desirable to take observations of the velocity of the water, and the water-tubes may be inserted at the time of locating the upper or measuring portion of the instrument of whatever form used. The tubes with bevel-edged bent end are to be used in taking accurate observations, and when the average velocity is to be ascertained these bent ends should be adjusted to a distance from the center of the main equal to 0.7071 of its radius.

In Figs. 5, 6, and 7 I have shown a form of ferrule with which the water-tube is to be left in permanent engagement. The ferrule $e^7$ has its end bored axially to receive the tube $a^5$, and between its ends its sides are open. Its lower bore is screw-threaded to engage a screw-thread formed on the tube. The upper end of the tube is provided with a screw-cap, $e^8$, when not in use; but this cap is replaced by a coupling-cock, $e^9$, as shown in Fig. 6, when the tube is to be connected to the velocimeter. In the open space between the ends of the ferrule the tube is provided with wings $w\ w$, which project in opposite directions from a band or ring, $w'$, fastened to the tube by a screw. These wings should be parallel with the bent end of the tube, and thus serve as a means of setting said bent end in a line parallel with the current after the ferrule is inserted.

All of the devices heretofore described for supporting the water-tubes in the mains are capable of being inserted while the main is in use and water flowing therein. I will now describe a means for securing the water-tubes permanently to the main, and which must be applied to the main or a pipe-section to be inserted therein when the same is not in use.

In the main A is bored a single opening of suitable size, as shown, for instance, at $f\ f$. The letters $f'\ f'$ indicate the two similar halves of an approximately elliptical mold having its long diameter greater than the diameter of the opening in the main, but its short diameter much less. The two parts $f'\ f'$ are curved to meet at their lower edges and form a chamber open at its top, their upper edges being provided with flanges $f^2\ f^2$, to fit the inner surface of the main around the opening. The ends of the mold have nozzle-like projections $f^3\ f^3$, the walls of which are divided longitudinally, being formed by semi-tubular projections from the parts $f'\ f'$. Around these split nozzle-like projections are placed bands $f^4\ f^4$, which serve to hold the two parts of the mold together. The mold is to be placed on the inside of the pipe-section, with its flanges against the inner surface of the pipe, and its long diameter in the same plane as the longitudinal diameter of the opening in the said pipe, and it is firmly braced in this position by means of a screw-jack, such as shown in Fig. 10, or by other suitable means. The mold being thus placed, a metal band, as shown at $f^5$, having its lower edge shaped to fit the exterior surface of the pipe, is placed around the opening, and then the long bent lower portions of the water-tubes $a^6$ and $a^7$ are passed in opposite directions through the nozzle-like portions $f^3\ f^3$ of the mold, which should hug these tubes snugly. The tubes being properly inserted, the mold openings in the pipe and band $f^5$ are to be filled with molten metal—such as lead or a suitable alloy—which on cooling forms a permanently-attached ferrule, from which the mold and band are to be removed. The dimensions of the mold are such as to support the tubes at the part of the main where the average velocity of water will prevail—viz., at a distance from the center of the main equal to 0.7071 times the radius of the main, and to the upper ends of these tubes, either before or after they are fixed, may be screwed coupling-pipes $p^2$ $p^2$, provided with suitable cocks.

It will be understood that any kind of water-tubes, however supported in the mains, may be connected by suitable pipes with the measuring or indicating tubes of the velocimeter.

In the form of velocimeter shown in Fig. 11, instead of using two separate glass tubes connected by a metal tube at top, I use a continuous glass tube bent to form two parallel limbs, $t^3$ $t^4$, which are secured in a vertical recess in the back board, $b^2$, so as to be flush with the front surface of said board. At the highest point of the connecting-bend between the two limbs is a cock, $k^6$, with a funnel-shaped mouth, said cock being useful either for introducing a liquid or permitting air to escape. At the lower ends of the limbs are connected rubber tubes $p^2 p^2$, in which are inserted metal sections $p^3$ $p^3$, connected by a small cross-tube, $p^4$, in which is a cock, $k^9$. At the extreme lower ends of the rubber tubes, where they are joined, are cocks $k^8$ $k^8$, so that water may be retained in said tubes and the glass limbs after observations have been completed at any station.

In using this instrument the glass limbs $t^3$ and $t^4$ and connected rubber tubes are to be filled with water, so that it stands at about the middle of said limbs, and then the upper portions of the tubes, including the connecting-bend, are filled with gasoline, oil, or some other fluid lighter than water. The water and lighter fluid are to be retained permanently in the instrument by closing the cocks $k^8$ $k^8$ when the instrument is to be removed from station to station.

This velocimeter may have one fixed scale divided into inches and parts thereof alongside or between the glass limbs, and in such case the reading of the difference between the heights of columns may be performed by reading the elevations of the water-columns in the respective limbs by means of verniers. The velocity is then determined from the formula $v = 10.328 \sqrt{d}$, provided gasoline be used, $d$ being the difference in height of the two columns in inches, and $v$ the velocity in inches; or the zero-point of the scale may be placed at the mid-length of the glass limbs and divided into inches and parts of inches in both directions from zero. At the commencement of the experiment, when the water is at rest, the zero-point should then be at the line connecting the tops of the two water-columns, and afterward the variation of heights in the columns may be read either by movable vernier or directly, in which case the velocity (gasoline being used) is calculated from the formula $v = 12.171 \sqrt{h}$, in which formula $h$ denotes the height of the column above or below the zero-point of the scale in inches, and $v$ the velocity of the water in the main in inches.

In order to effect coincidence of horizontal level between the zero-point and the tops of the water-columns at the beginning of the experiment, the scale is inscribed upon an adjustable strip, as at $s$, attached to the back board.

In this instrument the tubular glass limbs must have the same diameter throughout their lengths, and the cock $k^6$ must fit so nicely as to close the tube hermetically. If the velocity of the water is to be determined by one measurement—viz., that of $h$—when the difference, $d$, in height of columns is measured, they may differ in diameter.

The rubber tubes being connected to the water-tubes $a^5$ $a^5$ in the main and all cocks closed, then the cocks $k^9$ $k^9$ at the top of tubes $a^5$ $a^5$ are to be first opened, and next the cocks $k^8$ $k^8$ at the bottoms of the rubber tubes. If there is any air in the tubes, it will rise through the water and gasoline and should be permitted to escape through the cock at the top. This being done, the cocks $k^8$ $k^8$ are then closed, and the cock $k^7$ in the cross-tube $p^4$ is opened, so as to allow free communication between the water-columns, which quickly come to the same level. Then the cock $k^7$ is closed and the cocks $k^8$ $k^8$ again opened, and the velocimeter is ready for work. Before the instrument is detached from the main to be taken to another station all cocks must be closed.

In Figs. 12, 13, 14, illustrating an automatic recording-velocimeter, the letters $t^5$ and $t^6$ indicate two metal cylinders having a diameter sufficient to admit a float, $g$, and a length depending upon the maximum velocity which is to be measured. The cylinders have the same diameter, and are closed at their lower ends by screw-cups, which are bolted to bed-plate $h$, which in turn rests upon a base or foundation, $h'$. The upper ends of the cylinders are connected to the opposite ends of a vessel, R, which contains the recording devices. The cover R' of this vessel is inclined upward a little toward its center, where is an opening for the escape of air, said opening being normally closed by a screw-plug. The cover has a flange or rim, $r'$, which rests upon a leather gasket in the bottom of a groove surrounding the opening in the top of the vessel, and said cover is secured to the vessel by bolts, so that it may be readily removed and replaced. From the center of the float $g$ a cord or wire, $g'$, extends upward, and is wound upon a light drum, $i$, the axle of which has bearings in suitable hangers depending from the top wall of the vessel, and upon this axle is fixed another and smaller drum, $i'$, the diameter of which depends upon the ratio between the travel of the float and the length of the recording-cylinder S. This recording-cylinder has journals mounted in standards rising from the bottom of the vessel R, and to one of these journals is connected the train of a clock-work, V, so that the cylinder may be turned thereby. Above the cylinder is supported a horizontal track or pair of rails, one of which is shown at $l$, and upon this track travels a carriage, L, carrying a pointer or stylus, $l'$, the point of which is arranged to come in contact with the surface of the recording-cylinder. To one end of the carriage is attached one end of a cord, $g^2$, the other end of which is secured to the small drum $i^2$, a portion of the cord being also wound upon said drum, and to the other end of the carriage is secured one end of a cord, $g^3$, which passes over a pulley and has attached to its other end a counter-weight. From the bottoms or near the bottoms of the cylinders $t^5$ and $t^6$ lead pipes $p^4$ $p^4$, provided with cocks $k^{10}$ $k^{10}$, and adapted to be connected with the water-pipes $a^6$ and $a^7$ in the main A through any of the intermediate connections, substantially as heretofore described. The cylinders are connected together near their bottoms by a small pipe, $p^{11}$, provided with a cock, $k^{11}$, which may be opened to afford free communication between the cylinders for the purpose of bringing the water-columns to a common level.

It is intended to use gasoline to fill the cylinders above the water and the vessel R in this velocimeter. To allow the withdrawal of a portion of the gasoline from the vessel R when it is desired to remove the recording-cylinder and put in a fresh one, or for any other purpose, a pump, M, is provided, having its lower end connected by a pipe, $m$, with the vessel R on the top of one of the cylinders. This pump is constructed in any suitable manner for the purpose, and receives and discharges through the same pipe $m$, its barrel having capacity to hold such quantity of fluid as is necessary to be withdrawn from the vessel R.

The recording-cylinder is of thin metal and has a suitably-prepared sheet of paper placed upon it in the manner usual in machines using recording-cylinders.

The clock-work being wound up, the level of the water-columns is established in substantially the same manner as directed for the instrument shown in Fig. 11, and then the upper portions of the cylinders and vessel R filled with gasoline and the cover R' placed upon the vessel, the groove around the opening in the vessel being filled with water, so as to seal the joint between the cover and vessel. Communication being then opened to the main, the variation in the heights of the water-columns will cause the float to rise and fall and the carriage and pointer will be moved correspondingly, the latter marking the paper on the recording-cylinder as said cylinder is rotated by the clock-work, the position of the line traced by the pointer with relation to certain graduation-lines on the paper indicating the velocity of the water in the main.

When the instrument has been in use and it is desirable to remove the recording-cylinder and insert another and wind up the clock, or perhaps simply to change the paper and replace the cylinder, the following operations are to be performed, viz: First, the cocks at the upper ends of the water-tubes $a^6$ $a^7$ are to be closed; secondly, the cock in pipe $p^{11}$ is to be opened, so as to allow the water-columns to come to the same level; thirdly, the plug in the cover R'; fourthly, the cock in the pump-pipe $m$ is opened and the pump-piston drawn up, thereby partly emptying the vessel R; fifthly, the cover R' is raised; sixthly, the cord $g^3$ of the counter-weight is unhooked from the carriage and hooked to a pin, $z$, to keep it from falling out of reach; seventhly, the carriage-track, which is hinged at one end, is raised to a vertical position; eighthly, the clock is wound up; ninthly, the recording-cylinder is lifted from its bearings and another put in its place, or the paper changed and the cylinder returned; tenthly, the track is replaced and the counter-weight cord is again attached to the carriage; eleventh, if the pointer of the carriage stands at about the middle of the cylinder, it may be allowed to proceed from that point; if not, water (preferably distilled) must be filled into the vessel R' until the pointer moves to about the middle of the recording-cylinder; twelfthly, the cover is replaced on the vessel and the groove in which it sits filled with water; thirteenthly, the pump-piston is to be pushed down to return the gasoline to the vessel R', the air being allowed to escape through the aperture in the cover, this aperture being closed as soon as gasoline appears; fourteenthly, the cock in pipe $m$ is closed; fifteenthly, the cock in pipe $p^{11}$ is closed; sixteenthly, all the cocks in the pipes leading from the cylinders to the main are opened, and the instrument is ready to operate.

In this instrument the columns of water when equalized need not stand at precisely the middles of the cylinders, but near it. It is always preferable to use distilled water in the cylinders of this and other instruments, and especially if the water in the mains be turbid.

In the automatic recording-velocimeter illustrated in Fig. 15, the letter $t^7$ indicates a vertical metallic tube, the upper portion of which tapers on a curve, the manner of determining which will be presently explained; suffice it to say now that the curve is such that equal increments of velocity of the water in a main connected with the lower end of such pipe will cause the water-level in the pipe to rise equal distances when the velocities exceed 0.74 feet per second, while if the tube were of uniform diameter such would not be the case, as has been heretofore explained. Beside the tube $t^7$ stands another tube, $t^8$, having the same diameter in its lower portion as tube $t^7$, but expanded at its upper portion to form a vessel, $R^3$, for receiving the recording devices. The tube $t^7$ is much taller than tube $t^8$, and is connected with it by a pipe, $p^{12}$, which leads from a point near the top of tube $t^7$ to a point near the top of vessel $R^3$, and is provided with a cut-off cock, $k^{15}$. The upper end of tube $t^7$ is closed by a screw-plug, $e^{10}$, which sets low enough in the pipe to leave an open chamber above it, and at the center of this plug is an aperture normally closed by a small screw-plug, $k^{12}$. The top of vessel $R^3$ is closed by a heavy metallic lid, $R^4$, having a flange or rim, $r^4$, which sits on a packing-gasket at the bottom of a groove formed in the top edge of the wall of the vessel. At the center of this lid is an aperture normally closed by a screw-cock, $k^{13}$. The two tubes $t^7$ and $t^8$ are closed at their lower ends and stand on a base, $b^5$.

Upon an annular shoulder formed on the inner surface of the wall of tube $t^8$ where it begins to expand to form the vessel $R^3$ is supported and secured a horizontal partition, $n$, having a central perforation, $n'$, and four larger openings, $n^2$, near its outer edge, two only of such openings being seen, as the others are on a line at right angles to these two.

At one side of the center of the partition $n$ is located a conical step-bearing to receive the point of a vertical rod, O, which supports the recording-cylinder $G^2$, being firmly secured to the ends of two arms, $j$ $j$, which extend from the wall of the cylinder to its center at top and bottom. The upper end of the rod O projects above the cylinder and has a bearing in the end of an arm, $v$, which is pivoted to the top of a standard, J, the lower end of which is secured to the horizontal partition $n$. A vertical track or pair of rails, one of which is shown at $l^3$, also stands on the partition inside the cylinder, and the respective rails are connected with the standard J by brace-bars $j'$ $j'$, arranged in pairs below and above, one bar only of each pair being visible, as the other bars are behind and on the opposite sides of the rails and standard J. Between the two bars of the upper pair, and having journal-bearings therein, is mounted a sheave, I, and over this sheave passes a cord or wire, $i^3$, one end of which passes down through the aperture $n'$ in the partition $n$, and is attached to a float, F, in the lower part of the tube, while its other end passes down on the opposite side of the sheave and is attached to a carriage, L', arranged to travel vertically on the rails $l^3$, and provided with a pointer or stylus, $l^4$, which, by a suitable spring, is pressed against the inner surface of the cylinder-wall, so as to mark either directly upon the wall or upon a sheet of properly-prepared paper fixed thereto when the cylinder is rotated.

Around the top of the cylinder is secured a rim-gear or cog-toothed flange, W, and in a lateral extension near the top of vessel R is arranged a spring clock-work, V', upon a projecting shaft of the train of which is fixed a gear-wheel, $v'$, which meshes with the gear W, so as to turn the cylinder $G^2$ when the clock-work is in operation.

The two tubes are connected near their lower ends by a pipe, $p^{15}$, provided with a cut-off cock, $k^{15}$, and from near the bottom of said tubes lead pipes $p^{16}$ $p^{16}$, for connection with the tubes inserted in a water-main, the same as shown in Figs. 12 and 14.

When the velocimeter is to be used, the tops of the columns of water must be first brought to a certain fixed point, and as it must be ascertained after the cover has been placed on vessel $R^3$ whether they stand at this point or not, glass disks—such as shown at $y$—are inserted in the wall of tube $t^7$ at the proper height.

The instrument being connected to the main the same as the last described cuts off all communication with the main, the cock $k^{15}$ is opened to afford free communication between the two tubes, and water is filled in through the aperture at top of tube $t^7$ until the tops of the columns in both tubes stand at the proper level, as observed through the glass disks $y$. Then gasoline is filled in in the same manner until the entire space in both tubes and the connecting-pipe above the water is filled with gasoline. Communication should be then established with the main by opening first the cocks at the upper ends of the water-tubes in the main and then opening the cocks in the pipes $p^{16}$ $p^{16}$ next to the bottoms of the tubes $t^7$ and $t^8$. The clock-work having been wound up, the velocimeter will then commence to record the velocity of the water in the main. The float falls in tube $t^8$ as the combined forces—suction at the bottom of the water-columns in said tube and the pressure of the gasoline at its top—cause the level of the column to be lowered, the pressure of the gasoline resulting from the impact of the current raising the water in tube $t^7$.

It will be understood that the instrument now described, while remaining in a given position, is capable of measuring the velocity only when the water flows constantly in one direction, and that being such the tube $t^7$ receives the force of impact at its lower end, and the force of suction is executed on the lower end of tube $t^8$. The clock-work is designed to drive the recording-cylinder through a single revolution at uniform speed, and during the revolution equal increments and decrements of velocity will cause the pointer to move equal distances and make a corresponding record of velocities exceeding 0.7407 feet per second. For smaller velocities than 0.7407 feet per second the motions of the pointers are proportional to the square of the velocity.

To remove the recording-cylinder, communication with the main should be first cut off, then the water-columns brought to the same level by opening cock $k^{15}$. Then the cock should be closed in the pipe connecting the tops of the two tubes, and the cover removed from vessel $R^3$. Then turn up the arm $v$ to release the rod O and withdraw the recording-cylinder. The explanation already given is sufficient for replacing the cylinder and starting the instrument again to work.

I will now, referring to the diagram Fig. 17, explain the manner of determining the curve of the tapering portion of tube $t^7$, and at the same time illustrate a modification adapting the instrument to measure the velocity when the water flows alternately in both directions. This diagram I will suppose to be that of an instrument having proper dimensions for measuring a velocity of six feet per second in either direction. The float $F^2$ is contained in a cylindrical tube, $t^9$, four inches in diameter and about fourteen inches long, which is connected by a small pipe, $p^{17}$, with a vessel, $R^4$, supposed to contain the recording devices, and by a small pipe, $p^{18}$, with the pipes which connect with the main. The other tube, $t^{10}$, for a distance of 0.3703 of a foot up and down from the zero-line $o\ o$, has the form of a cylinder of the same diameter as tube $t^9$, and up and down from this cylindrical portion the tube tapers on a curve, the equation of which for the abscissa $x$ and ordinates $y$, as shown, and $r$ the radius of the tube at the zero-line, is $y^2 = \dfrac{r^2}{\sqrt{5.4x+1}}$. When the velocity of the water is less than 0.74074 feet per second, the float will rise or fall, according to the direction of the current, a distance as shown by the following formula, in which $h$ represents the movement of the float per second, $h = \dfrac{1.35v^2}{2} = 0.675v^2$, $v$ being the velocity in feet, and $h$ the distance in inches traveled by the float, and therefore $v = \sqrt{\dfrac{h}{0.675}}$. The column of water in the other tube will rise or fall the same distance. When the column of water rises or falls in response to a current through a distance equal to 0.37037 of an inch, the float will have traveled the same distance in the opposite direction, and the velocity indicated will be $v = \sqrt{\dfrac{0.37037}{0.675}} = \sqrt{0.5487} = 0.7407$ feet per second. From that to the full velocity which the instrument is adapted to measure the float will rise or fall, according to the direction of the current, one inch for every foot (per second) increase in velocity.

It will be understood that if the tube $t^9$ tapered or became contracted only above the zero-line the instrument would only be adapted to measure the velocity of a current which tends to drive the water upward in curved tube. Such an instrument is shown in Fig. 15, and it is unimportant, so far as accuracy is concerned, what the other dimensions may be, provided the tube which contains the float and the other tube have the same diameter at the zero-line, and to a distance of 0.37037 inches above that line, and that the impact-tube is contracted above this point on a curve, as indicated. Of course, with reference to capacity for measurement, the lengths of the tubes must be governed by rules which have been already set forth as applying to all forms of the instrument.

The velocimeter shown in Fig. 16 differs from that in Fig. 15 simply in the shape of the tubes, and in that the instrument in Fig. 16 is arranged for measuring the velocity in both directions. Let us suppose Fig. 16 to illustrate an instrument having the capacity to measure a maximum velocity of six feet per second. The letter $t^{11}$ indicates a tube about eighty-six inches high, of uniform diameter, closed at both ends, and provided at the top with a funnel and tap for introducing liquid and permitting escape of air. The letter $t^{12}$ designates the tube in which the float $F^2$ moves. This tube is cylindrical at its middle portion, and its line of mid-length is on a level with the mid-length line of tube $t^{11}$, which will hereinafter be referred to as the zero-line. Up and down from this line for a distance of 0.37037 of an inch the uniform cylindrical portion of tube $t^{12}$ has the same diameter as tube $t^{11}$, but flares upward and downward from its said cylindrical portion, the vertical curve of its flaring walls being determined from the following formula, the abscissae being indicated by $x$ and the ordinates by $y - y^2 = 10.8x - 4$.

Upon the upper end of the tube $t^{12}$ is a vessel, $R^5$, which has its upper end connected with the upper end of tube $t^{11}$ by a pipe, $p^{20}$, provided with a cut-off cock below the top of the vessel. The vessel $R^5$ is constructed and furnished with recording devices precisely the same as vessel $R^3$ in Fig. 15; but when the float $F^2$ in tube $t^{12}$ has its middle at the zero-line the carriage and pointer stand about midway the height of the recording-cylinder, so that the pointer may have room to move in both directions. The vertical extent of the two flaring portions and intermediate cylindrical portion of tube $t^{12}$ is equal to the extreme range of the float, and above and below this range the diameter is immaterial. The lower ends of the two tubes are to be connected to a main by such connecting pipes and tubes as have been already described and pointed out for use when accurate measurements are required. The mode of using this velocimeter is precisely the same as that instrument shown in Fig. 15, and therefore needs no further explanation.

The float of a recording-velocimeter of my construction must be of such specific gravity that when in use it will, for about half its height, be immersed in water, and for the other half in the gasoline or other superincumbent fluid. It must be of sufficient strength to prevent its collapsing or changing shape when exposed to the great pressure which sometimes prevails in water-works mains, and must be of sufficient diameter to enable it to readily follow the motions of the columns of water in which it floats, while at the same time being able to perform the work required of it in moving the pointer or stylus without appreciable change in the depth of its immersion. It is preferably given the shape of a cylinder, and its height should be the smallest which considerations of strength and flotation will admit of. It may be made of wood of proper specific gravity and protected against absorption of water or the superincumbent fluid by a thin and close cover of metal or some other suitable substance which will withstand all deleterious effects of both fluids; or it may be made of thin sheet metal, preferably aluminum, in the shape of a hollow cylinder with a small capillary tube at the bottom, so that when filled with gasoline (or its equivalent) and placed within the velocimeter tube or cylinder the pressure of the fluid inside the float will always be the same as the pressure in the main. In such a float, no matter how thin the metal, the pressure will not change its form in the least, which is important when it is considered that any change in the shape of the float will change its depth of immersion. In the construction of such a hollow float I have calculated a formula which must be followed to insure equilibrium. Let $r$ equal radius of float in inches. Let $w$ equal weight of one cubic inch of water in pounds. Let $a$ equal weight of one cubic inch of aluminum (or other metal) in pounds. Let $h$ equal height of float in inches, which is to be immersed to its middle. Let $d$ equal thickness of the metal in inches. Let $g$ equal weight of one cubic inch of gasoline (or equivalent fluid) in pounds, and the following is the equation: $4da(r+h)=\frac{rh}{2}(w-g,)$ from which either $h$ or $d$ may be determined if the other of these two quantities is fixed and $r$, $w$, $g$, and $a$ are known.

It will readily be understood that even if the differences in the heights of the columns in the various forms of the instrument should not strictly follow the law as laid down in the several formulæ, the general and essential principle of the instrument is as indicated, and appropriate coefficients for correction may be easily found by experiment when it is discovered that there is a variation from the law in practical operation.

I am aware that in instruments for measuring the speed of vessels and the velocity of running liquid two vertical tubes have been connected together at their upper ends and opening in opposite directions at their lower ends, said tubes having their lower portions filled with a fluid, in which they are immersed, and their upper portions respectively filled with separate columns of air, between which is interposed a body of mercury; and I am also aware that in such an instrument the lower portions of the tubes have been separated from the upper portions by elastic diaphragms, upon which the fluid-columns in said lower portions act to influence the movement of a body of air in the connected upper portions. I lay no claim to either of the instruments so constructed, as it is of the essence of my improvement that a lighter fluid must directly connect the tops of the columns of liquid in the lower portions of the tubes, so that the forces of impact and suction will act together on the interposed lighter fluid, and said lighter fluid be unlimited and unretarded in its range of displacement by any interposed obstruction.

Having now described my invention and explained the operation thereof, I claim—

1. The herein-described method of indicating the velocity of running fluid, the same consisting in causing two columns of the fluid to be respectively acted upon simultaneously by the impact and suction or draft of the stream, and connecting the upper ends of said columns directly by an inclosed fluid medium having a less specific gravity than that of the fluid the velocity of which is to be ascertained, substantially as described, whereby the combined effects of impact and suction are applied to effect a displacement of the interposed lighter medium, substantially as described.

2. The herein-described method of securing within certain limits uniform indications in a tube from successively equal increments or decrements of velocity in a stream with the current of which the lower end of the tube is connected, the same consisting in using a tube with its bore gradually contracted on a curve, the equation of which corresponds to the ratio of decrease in elevation of a column of liquid of uniform diameter acted upon by such equal changes of velocity, substantially as set forth.

3. In a velocimeter of the class described, the combination with each other of two vertical tubes connected together at their upper ends and opening in opposite directions at their lower ends, the lower portions of said tubes containing liquid such as that the velocity of which is to be measured, and their upper portions being filled with a fluid medium of less specific gravity, which directly connects the upper ends of the liquid-columns in the lower portions of the tubes, substantially as described.

4. In a velocimeter of the class described, the combination with each other of two vertical tubes connected together at their upper ends and opening in opposite directions at their lower ends, the lower portions of said tubes containing liquid such as that the velocity of which is to be measured, and their upper portions being filled with a liquid of less specific gravity, which directly connects the upper ends of the liquid-columns in the lower portions of the tubes, substantially as described.

5. In a recording velocimeter in which two columns of liquid are acted upon respectively by impact and suction, the combination, with said columns, of a body of fluid of less specific gravity, interposed between and directly connecting their upper ends, a float carried by one of said columns and lying between the same and the superincumbent lighter fluid, and indicating devices arranged to receive motion from said float, substantially as described.

6. In a velocimeter, the combination, with two vertical tubes connected together at their upper ends and opening in opposite directions at their lower ends, of a float and indicating devices arranged to be operated thereby, inclosed in one of said tubes, substantially as described.

7. The combination, in a velocimeter, of two vertical tubes connected together at their upper ends and opening in opposite directions at their lower ends, of cocks arranged to close said tubes respectively near their lower ends, a cross-pipe connecting said tubes below their tops and above said cocks, and a cut-off cock in said cross-pipe, substantially as described, whereby columns of liquid in said tubes may be brought to the same level.

8. The combination, with the two tubes connected together at their upper ends and opening in opposite directions at their lower ends, the columns of liquid in the lower portions of said tubes, and the superincumbent body of lighter fluid directly connecting the tops of said columns, of the float arranged upon the top of the lower column in one of said tubes, the pointer connected with said float for operation thereby, the recording-cylinder arranged to rotate in contact with said pointer, and means for automatically rotating said cylinder, the said pointer, recording-cylinder, and operating devices being inclosed in one of the tubes and surrounded by the lighter fluid, which rests upon the heavier columns in the low portions of said tubes, substantially as described.

9. In a velocimeter, the combination, with a measuring-tube containing a comparatively heavy liquid in its lower portion and a lighter liquid resting thereon, of a hollow float resting on the heavier and filled with the lighter liquid, and having an opening in its bottom, substantially as and for the purpose set forth.

In testimony whereof I have signed this specification in the presence of two subscribing witnesses.

HENRY FLAD.

Witnesses:
J. F. MALLINCKRODT,
FRITZ HÖPPNER.